United States Patent
Tetzloff et al.

(10) Patent No.: US 12,292,337 B2
(45) Date of Patent: May 6, 2025

(54) ROLLER TEMPERATURE MONITORING

(71) Applicant: Caterpillar Inc., Peoria, IL (US)

(72) Inventors: Aaron Michael Tetzloff, Dunlap, IL (US); Eric J Johannsen, Washington, IL (US); David Jennings Hakes, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/207,049

(22) Filed: Jun. 7, 2023

(65) Prior Publication Data

US 2024/0410763 A1   Dec. 12, 2024

(51) Int. Cl.
*G01K 1/024* (2021.01)
*B62D 55/092* (2006.01)
*B62D 55/24* (2006.01)
*G01K 1/14* (2021.01)

(52) U.S. Cl.
CPC .......... *G01K 1/024* (2013.01); *B62D 55/092* (2013.01); *B62D 55/24* (2013.01); *G01K 1/14* (2013.01)

(58) Field of Classification Search
CPC ........ G01K 1/024; G01K 1/14; B62D 55/092; B62D 55/24; H04Q 9/00; H04Q 2209/00; H04Q 2209/40; H04Q 2209/43; H04Q 2209/47; H04Q 2209/70; H04Q 2209/75; H04Q 2209/80; H04Q 2209/82; H04Q 2209/823; H04Q 2209/826; H04Q 2209/84
See application file for complete search history.

(56) References Cited

U.S. PATENT DOCUMENTS

| | | | |
|---|---|---|---|
| 9,840,291 B2* | 12/2017 | Kita | B62D 55/092 |
| 10,696,337 B2* | 6/2020 | Hawkins | B62D 55/15 |
| 11,541,952 B2 | 1/2023 | Stefano | |
| 2019/0353605 A1 | 11/2019 | Baarman et al. | |
| 2022/0412809 A1* | 12/2022 | Moretti | G01K 7/16 |

FOREIGN PATENT DOCUMENTS

| | | |
|---|---|---|
| CN | 206494024 | 9/2017 |
| EP | 4119426 | 1/2023 |
| WO | 2021156807 A1 | 8/2021 |
| WO | 2022036449 A1 | 2/2022 |

* cited by examiner

*Primary Examiner* — Franklin D Balseca

(57) ABSTRACT

Overheating of the rollers in a track on mobile equipment can result in failure of the track. Accordingly, embodiments are disclosed for a temperature monitoring device that can be installed within an oil fill hole of each roller. Each temperature monitoring device may monitor the oil temperature within a respective roller, and communicate that oil temperature or other temperature indication to a controller. The controller may alert a human operator or another system when the temperature of a roller exceeds a predefined threshold that is indicative of overheating.

20 Claims, 6 Drawing Sheets

ROLLER TEMPERATURE MONITORING

TECHNICAL FIELD

The embodiments described herein are generally directed to track rollers, and, more particularly, to monitoring the temperature of a track roller.

BACKGROUND

Tracked machines have advantages over wheeled machines in environments with rough and varied terrain, such as mining or construction sites. For example, tracks distribute the weight of the machine over a larger area than wheels do, which can provide improved traction, power efficiency, and the like.

The rollers in a track are critical to the operation of the track. One failure mode of a roller is the loss of oil, which can result in overheating and failure of the roller, and thereby, failure of the track. Even without oil loss, a roller may overheat during operation. In either case, the failure of a roller can result in downtime for the machine.

U.S. Pat. No. 10,696,337 describes a monitoring device that may monitor the temperature inside of end caps that are used to mount a roller to an undercarriage frame. The present disclosure is directed toward overcoming one or more of the problems discovered by the inventors.

SUMMARY

In an embodiment, a roller comprises: a shaft including an interior cavity along a longitudinal axis of the shaft, at least one aperture along an axis of the shaft, which is at a non-zero angle with respect to the longitudinal axis, wherein the at least one aperture is in fluid communication with the interior cavity, and an oil fill hole through one end of the shaft, along the longitudinal axis, and in fluid communication with the interior cavity; a rim configured to rotate around the shaft; an annular space between the shaft and the rim, wherein the annular space is in fluid communication with the at least one aperture of the shaft; and a temperature monitoring device mounted in the oil fill hole of the shaft.

In an embodiment, a roller comprises: a shaft including an interior cavity along a longitudinal axis of the shaft, at least one aperture along an axis of the shaft, which is at a non-zero angle with respect to the longitudinal axis, wherein the at least one aperture is in fluid communication with the interior cavity, and an oil fill hole through one end of the shaft, along the longitudinal axis, and in fluid communication with the interior cavity; a rim configured to rotate around the shaft; an annular space between the shaft and the rim, wherein the annular space is in fluid communication with the at least one aperture of the shaft; and a temperature monitoring device mounted in the oil fill hole of the shaft, wherein the temperature monitoring device matches a cross-sectional profile of the oil fill hole, in a plane that is orthogonal to the longitudinal axis, so as to plug the oil fill hole, and wherein the temperature monitoring device includes a temperature sensor configured to measure a temperature of oil within the interior cavity, wherein the temperature sensor comprises a probe that extends from one end of the temperature monitoring device into the interior cavity, and a wireless transmitter configured to wirelessly communicate an indication of the measured temperature to at least one controller of a mobile equipment on which the roller is installed.

In an embodiment, a method of monitoring temperatures in a plurality of rollers in one or more tracks of a mobile equipment is disclosed. The method comprises: providing a temperature monitoring device in an oil fill hole of each of the plurality of rollers; and by a controller onboard the mobile equipment, receiving an indication of a measured temperature from each temperature monitoring device, determining whether or not the measured temperature exceeds a predefined threshold based on the received indication of the measured temperature, and when determining that the measured temperature exceeds the predefined threshold, issuing an alert . . .

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
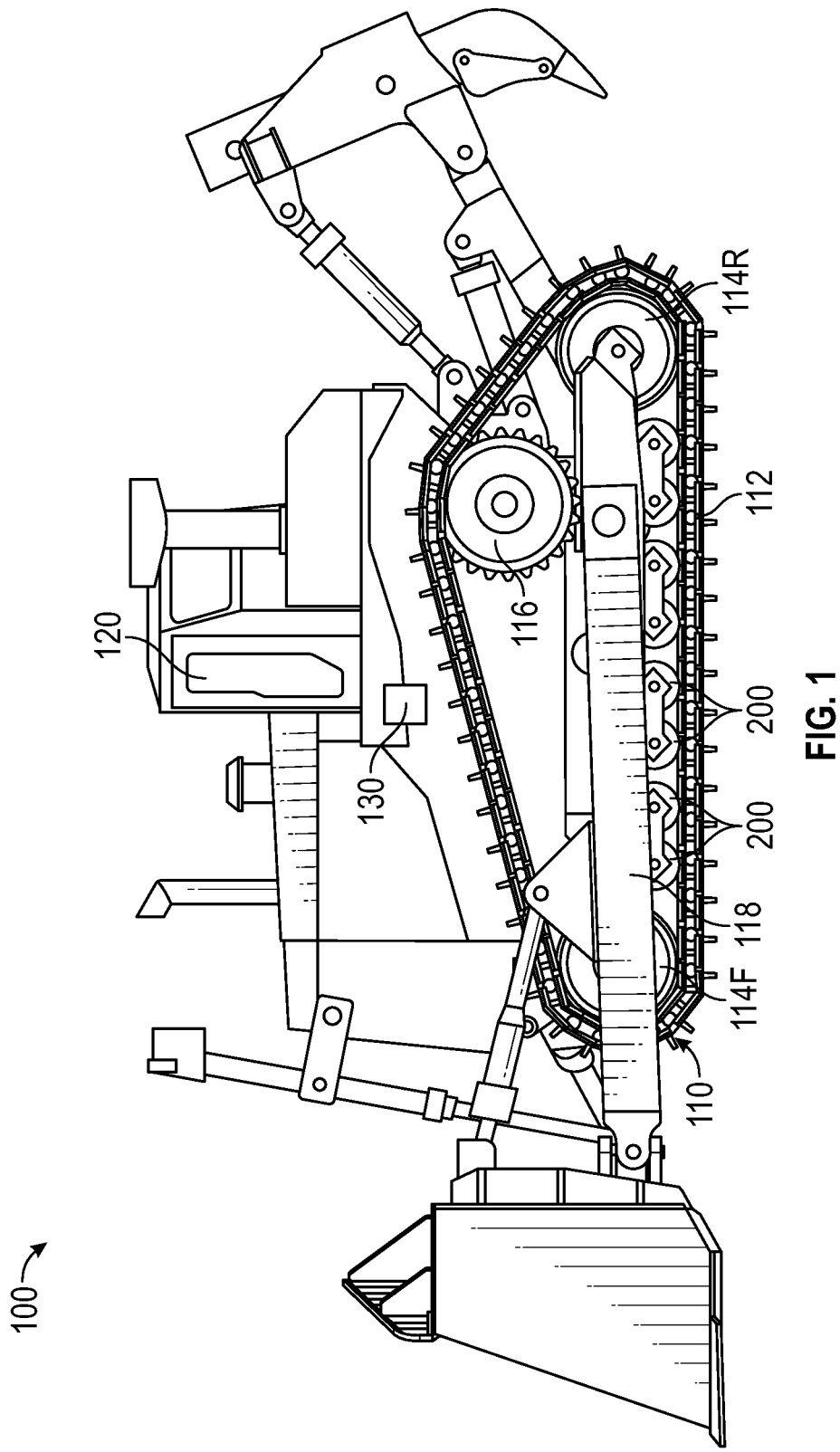
FIG. 1 illustrates a side view of an example of mobile equipment, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description, and, for clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

As used herein, the terms "respective" and "respectively" signify an association between members of a group of first components and members of a group of second components. For example, the phrase "each component A connected to a respective component B" would signify A1 connected to B1, A2 connected to B2, . . . and AN connected to BN.

FIG. 1 illustrates a side view of an example of mobile equipment 100, according to an embodiment. Mobile equipment 100 may be any machine that uses at least one track to move relative to the ground. Examples of tracked mobile equipment 100 include, without limitation, a bulldozer, excavator, track loader, asphalt paver, cold planer, drill, electric rope shovel, forest machine, hydraulic mining shovel, material handler, pipelayer, as well as any tracked vehicle manufactured by or for Caterpillar Inc. of Peoria, Illinois, or any of its affiliates or competitors.

Mobile equipment 100 may comprise a track 110, a cabin 120, and a controller 130. While only a single track 110 is visible, it should be understood that mobile equipment 100 may comprise a pair of parallel tracks 110 on opposing sides of mobile equipment 100. Cabin 120 houses controls for operation of mobile equipment 100 by a local human operator. Controller 130, which may be one or more electronic control units (ECU), may comprise one or more hardware processors, memory, input and output interfaces, wireless transceivers, and/or the like, that enable controller 130 to control one or more components of mobile equipment 100, as well as provide information to a console in cabin 120 for viewing by a local human operator. In an embodiment, controller 130 may also be configured to transmit such information over a wireless network to one or more remote terminals for viewing by a remote human operator. In addition, controller 130 may be configured to receive output signals from one or more sensors onboard mobile equipment 130, process those output signals, and generate information, which can be output to the console or remote terminal, and/or generate control signals, which can be output to one or more components of mobile equipment 100, based on the processed output signals.

Each track 110 may comprise a belt 112, a front idler wheel 114F, a rear idler wheel 114R, a final drive 116, an undercarriage frame 118, and a plurality of rollers 200 mounted to undercarriage frame 118. Belt 112 encircles front idler wheel 114F, rear idler wheel 114R, final drive 116, and rollers 200.

As used herein, a reference numeral with an appended letter will be used to refer to a specific component, whereas the same reference numeral without any appended letter will be used to refer collectively to a plurality of the component or to refer to a generic or arbitrary instance of the component. Thus, for example, the term "idler wheels 114" refers collectively to front idler wheel 114F and idler wheel 114R, and the term "idler wheel 114" may refer to either front idler wheel 114F or rear idler wheel 114R.

Final drive 116 rotates under the power of the engine (not shown) of mobile equipment 100 to provide the desired torque to belt 112. Idler wheels 114, which rotate with belt 112, maintain the shape of belt 112 and maintain the tension in belt 112, so that belt 112 does not slide laterally. Rollers 200, which are held in place by undercarriage frame 118 and also rotate with belt 112, increase the contact area of belt 112 with the ground. In particular, rollers 200 contact belt 112 to force belt 112 downwards into contact with the ground. It should be understood that track 110 may comprise other components, beyond these core components.

Figure 2:
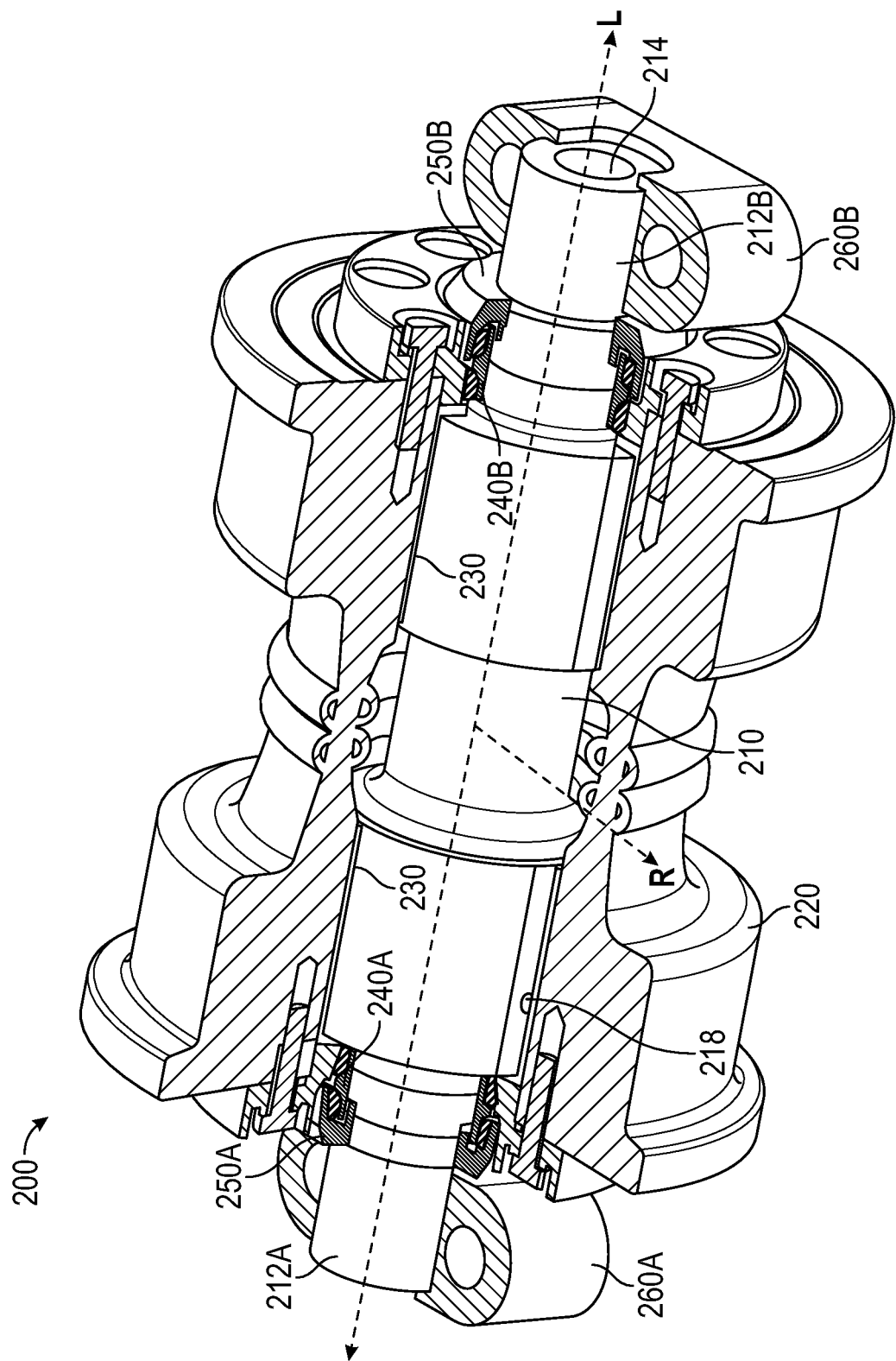
FIG. 2 illustrates a cut-away perspective view of an example of a roller, according to an embodiment.

FIG. 2 illustrates a cut-away perspective view of an example of a roller 200, according to an embodiment. The illustrated roller 200 is for a large track-type tractor (LTTT). However, disclosed embodiments may be utilized with any type of roller 200 of any size, including rollers 200 for a medium track-type tractor (MTTT). While some of the components, shapes, dimensions, and the like will differ between different types of rollers 200, it will be apparent to a person of ordinary skill in the art how to utilize and/or adapt the disclosed embodiments for each type of roller 200.

Roller 200 comprises a shaft 210 with a longitudinal axis L. Shaft 210 is configured to rotate freely within a rim 220. In other words, rim 220 is configured to rotate around shaft 210, while shaft 210 is fixed within roller frame 118. In this manner, rim 220 can roll along the interior of belt 112 to increase the contact area between belt 112 and the ground.

Shaft 210 may comprise two shaft ends 212A and 212B, along longitudinal axis L, that extend outside of opposing ends of rim 220. In the illustrated embodiment, shaft ends 212 are cylindrical around longitudinal axis L. However, in an alternative embodiment (e.g., for MTTT), one or both shaft ends 212 may have a flat, extending parallel to longitudinal axis L, along at least a portion of the outer surface.

An oil fill hole 214 may be formed in at least one shaft end 212 of shaft 210. Oil fill hole 214 may be in fluid communication with an interior cavity that extends through the center of shaft 210 to one or a plurality of radial apertures 218 that extend radially from the interior cavity through shaft 210, along a radial axis R that is orthogonal to longitudinal axis L. Thus, oil supplied through oil fill hole 214 flows longitudinally through the interior cavity of shaft 210 and radially out through aperture(s) 218, to fill an annular space 230 between shaft 210 and rim 220. While aperture(s) 218 will primarily be described and illustrated herein as radial, aperture(s) 218 may extend along any axis of shaft 210 that is at a non-zero angle with respect to longitudinal axis L. Thus, aperture(s) 218 do not need to be perfectly orthogonal (i.e., at a 90-degree angle) to longitudinal axis L. However, for design and/or manufacturing purposes, it may be best for the aperture(s) 218 to be at an angle between 85 and 105 degrees from longitudinal axis L.

Roller 200 may comprise an annular seal 240 between rim 220 and each shaft end 212 to seal annular space 230 along longitudinal axis L. For example, annular seal 240A seals annular space 230 on shaft end 212A, and annular seal 240B seals annular space 230 on shaft end 212B. Thus, oil is prevented from flowing out of annular space 230, and thereby out of roller 200, except through oil fill hole 214.

Roller 200 may comprise an annular collar 250 between each annular seal 240 and a respective shaft end 212, to lock each annular seal 240 in place with respect to rim 220. For example, annular collar 250A holds annular seal 240A in place within the interior of rim 220, and annular collar 250B holds annular seal 240B in place within the interior of rim 220. Each annular collar 250 may be press-fit into the respective end of rim 220 and fastened by any suitable fastening means.

Each shaft end 212 may be held in an end cap 260. For example, shaft end 212A may be held in end cap 260A, and shaft end 212B may be held in end cap 260B. End caps 260 may be fixed to undercarriage frame 118, such that each shaft 210 of each roller 200 is fixed in place within undercarriage frame 118, while each rim 220 of each roller 200 is free to rotate around a respective shaft 210.

Figure 3:
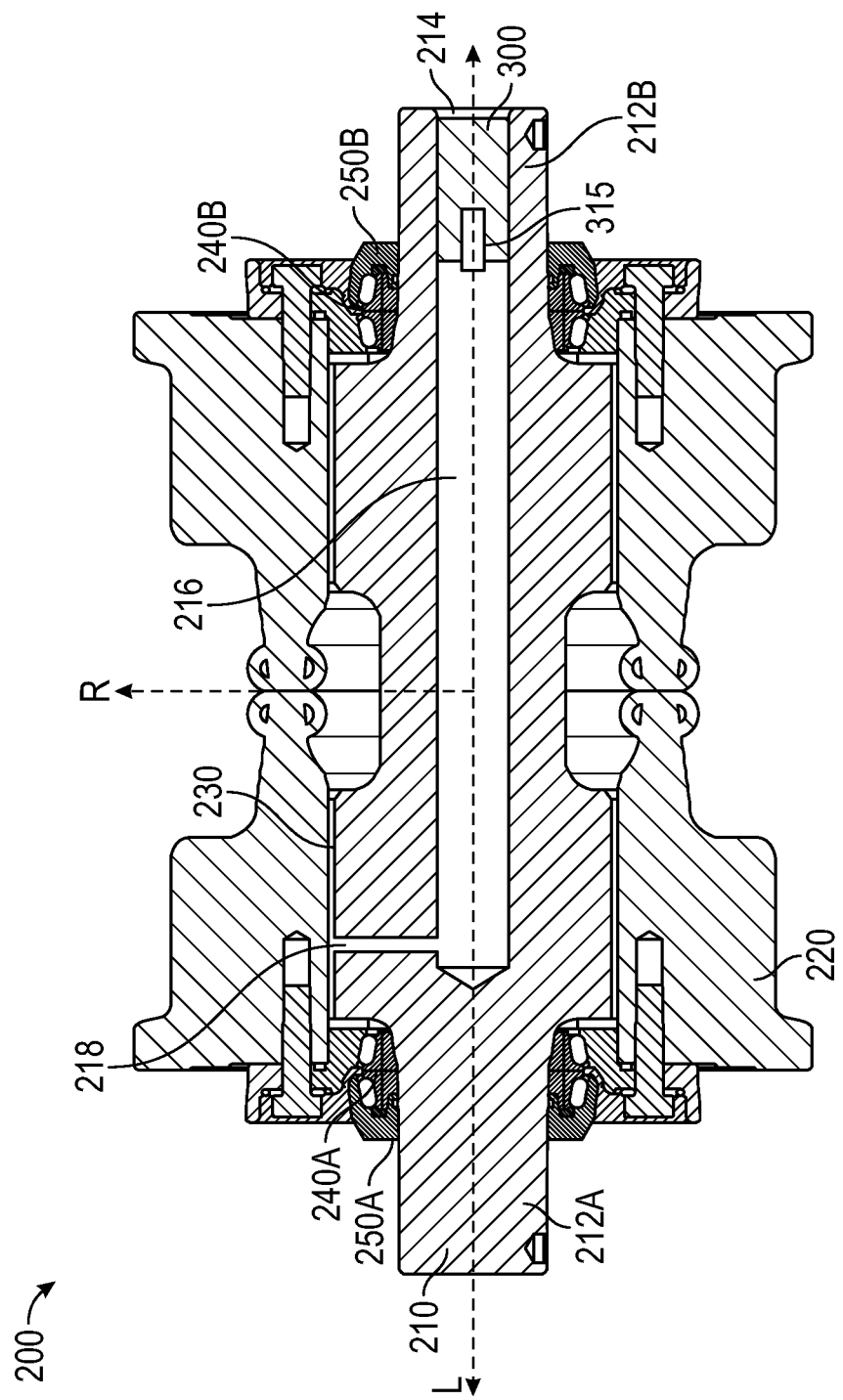
FIG. 3 illustrates a cross-sectional view of an example of a roller, according to an embodiment.

FIG. 3 illustrates a cross-sectional view of an example of a roller 200, according to an embodiment. In this view, it can be seen that oil fill hole 214 is in fluid communication with an interior cavity 216, which is in fluid communication with at least one aperture 218, which is in fluid communication with annular space 230. Thus, oil, supplied into oil fill hole 214, flows longitudinally through interior cavity 216 and radially through aperture(s) 218 into annular space 230, where it is prevented from flowing out of the longitudinal ends of annular space 230 by annular seals 240.

As illustrated, a temperature monitoring device 300 is inserted or mounted, along longitudinal axis L, into oil fill hole 214. Temperature monitoring device 300 may be secured within oil fill hole 214 via any fastening means, including, without limitation, corresponding threads (e.g., temperature monitoring device 300 could by cylindrical with threads on an exterior surface of temperature monitoring device 300 that are configured to mate or engage with threads on an interior surface of oil fill hole 214), a friction fit, one or more screws, one or more bolts and nuts, and the like.

Temperature monitoring device 300 may measure the temperature of roller 200. In an embodiment, temperature monitoring device 300 measures the temperature of the oil inside interior cavity 216 of shaft 210. For example, temperature monitoring device 300 may comprise a temperature sensor with a probe 315 that extends, along longitudinal axis L, from the inner end of temperature monitoring device 300 (i.e., facing interior cavity 216) into interior cavity 216 of shaft 210, so as to physically contact the oil within interior cavity 216. Temperature monitoring device 300 may also comprise a transmitter that wirelessly transmits the sensed oil temperature to controller 130. The transmitter may be positioned at an outer end of temperature monitoring device 300 (i.e., away from interior cavity 216) to reduce interference caused by the materials of roller 200 between the transmitter and a receiver. In an alternative embodiment, temperature monitoring device 300 could be wired to controller 130, so as to communicate the sensed oil temperature to controller 130 via a wired connection. However, such an embodiment increases the complexity of the system, since wires must be run between the components.

Temperature monitoring device 300 may be sized and shaped to match the cross-sectional profile of oil fill hole 214, in a plane that is orthogonal to longitudinal axis L, so as to completely fill the entire cross-sectional profile or area of oil fill hole 214, and thereby plug oil fill hole 214. In this case, temperature monitoring device 300 simultaneously monitors oil temperature and acts as a plug or stopper within oil fill hole 214. Thus, temperature monitoring device 300 prevents oil from flowing from interior cavity 216 of shaft 210, out of oil fill hole 214, and into the exterior environment of roller 200, while also measuring the temperature of roller 200 (e.g., the temperature of oil in interior cavity 216).

To fill shaft 210 with oil, oil may be supplied through oil fill hole 214 into interior cavity 216. This oil may flow longitudinally into interior cavity 216 and radially out through aperture(s) 218 to fill annular space 230. Temperature monitoring device 300 may then be inserted and fastened within oil fill hole 214, to plug oil fill hole 214 and monitor the temperature of oil within interior cavity 216.

Figure 4:
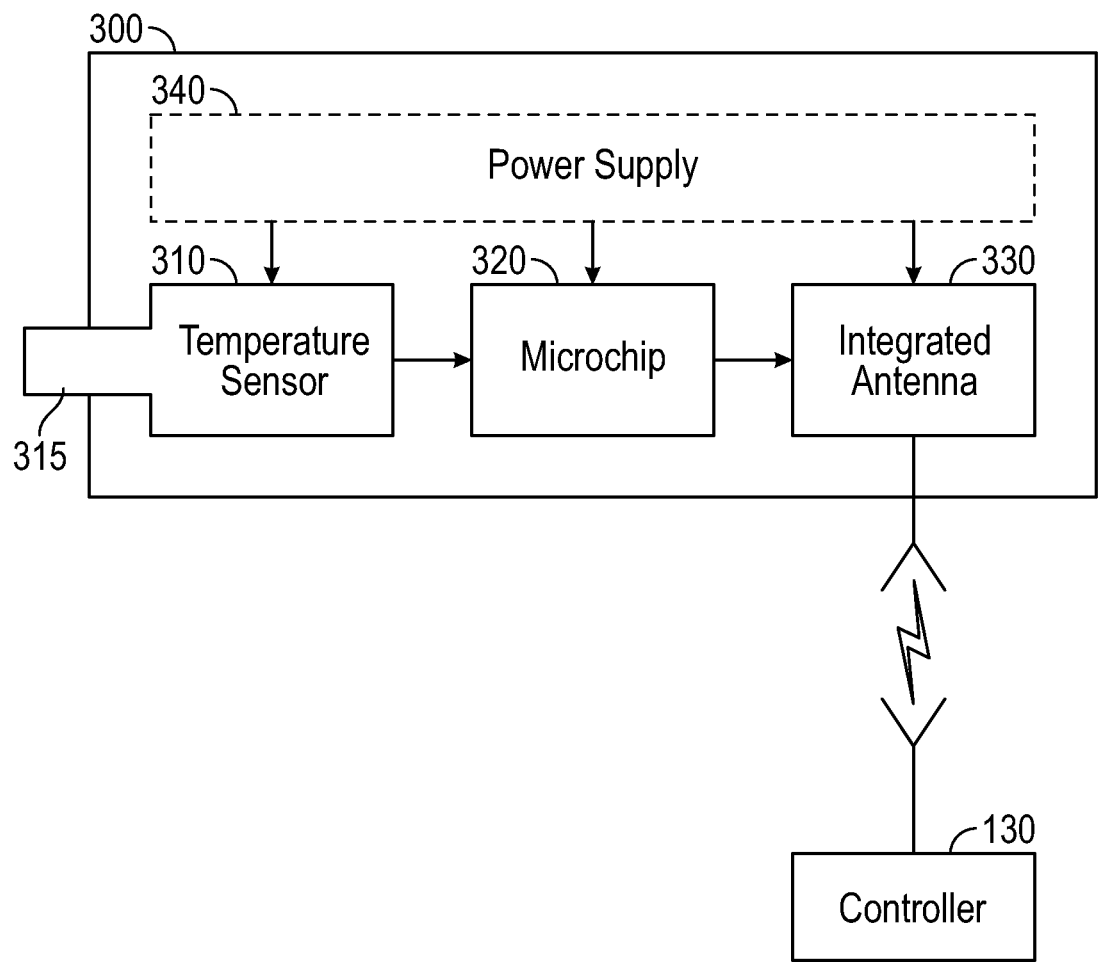
FIG. 4 illustrates a schematic diagram of a temperature monitoring device for monitoring the temperature of a roller, according to an embodiment.

FIG. 4 illustrates a schematic diagram of a temperature monitoring device 300 for monitoring the temperature of a roller 200, according to an embodiment. Temperature monitoring device 300 may comprise a temperature sensor 310, a microchip 320, and an integrated antenna 330. In some embodiments, temperature monitoring device 300 may also comprise a power supply 340. In an alternative embodiment which utilizes a wired connection, integrated antenna 330 may be replaced with a wired interface, and power supply 340 may comprise an electrical connection via the same wired interface.

Temperature sensor 310 may comprise a probe 315, which may be configured to physically contact the oil within shaft 210, and particularly, within interior cavity 216. The oil temperature, sensed by temperature sensor 310 via probe 315, is communicated as an output signal to microchip 320 (e.g., via one or more electrical traces or wires). Microchip 320 may process the output signal, for example, to prepare an indication of the oil temperature for transmission. Microchip 320 communicates the indication of the oil temperature to integrated antenna 330, and integrated antenna 330 communicates the indication of the oil temperature to controller 130 for further processing, via a wireless connection. In an alternative embodiment that utilizes a wired connection, microchip 330 may communicate the indication of the oil temperature to controller 130 via the wired connection.

In an embodiment, the indication of oil temperature that is communicated by temperature monitoring device 300 to controller 130 may be the temperature value. In this case, microchip 320 may do little more than convert the temperature value into a format for communication. In an alternative embodiment, microchip 320 may compare the temperature value sensed by temperature sensor 310 to a predefined threshold (e.g., stored in memory on microchip 320), representing potential overheating. In this case, the indication of oil temperature may be a Boolean value indicating whether or not the sensed temperature value exceeds the predefined threshold.

In an embodiment that includes power supply 340, power supply 340 may power any of the components which need electrical power, including temperature sensor 310, microchip 320, and/or integrated antenna 330 (or wired interface). In a wireless embodiment, power supply 340 may comprise a battery, such as a lithium-ion battery. In this case, temperature monitoring device 300 may be considered an active Radio Frequency Identification (RFID) tag or a battery-assisted passive (BAP) RFID tag.

In an alternative embodiment, temperature monitoring device 300 may consist of no battery or other internal power supply 340. In other words, power supply 340 is omitted. In this case, temperature monitoring device 300 may be considered a passive RFID tag. Passive RFID tags contain no battery, and are powered instead by the electromagnetic waves, received from an RFID interrogator or reader, which induce a magnetic field in integrated antenna 340. Non-limiting examples of a passive RFID tag that may be used as, or to form the basis or template for, temperature monitoring device 300 include, without limitation, the Model 2510-TMP Temperature Sensing Tag, the Model 7334-TMP Temperature Sensing Bus Bar Tag, and the Model 9824-TMP Temperature Sensing White PET Label Tag, which are all manufactured by RFID, Inc. of Aurora, Colorado. In a similar manner, BAP RFID tags may be at least partially powered by the electromagnetic waves received from an RFID reader.

Figure 5:
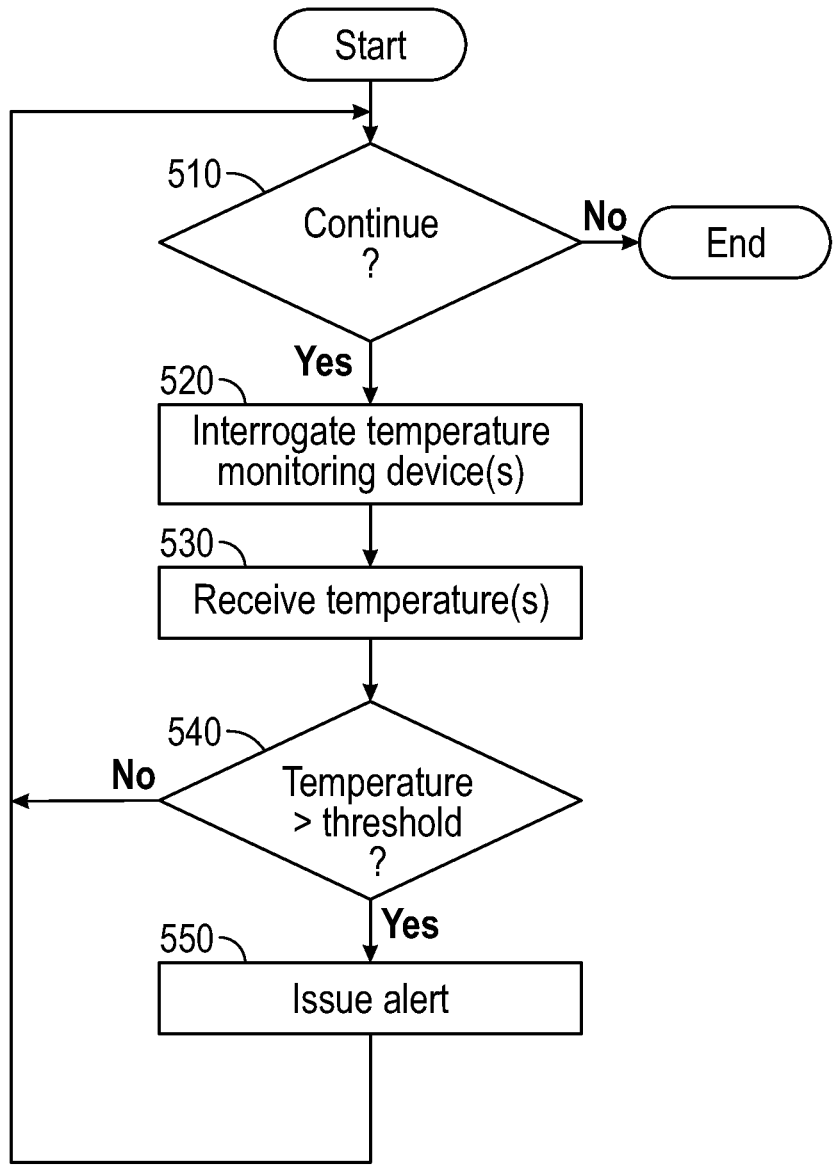
FIG. 5 illustrates a process for temperature monitoring by a controller, according to an embodiment.

FIG. 5 illustrates a process 500 for temperature monitoring by controller 130, according to an embodiment. Process 500 may be executed over a plurality of iterations, for example, starting from when mobile equipment 100 is turned on or a temperature monitoring mode is activated and ending when mobile equipment 100 is turned off or the temperature monitoring mode is deactivated. Process 500 may be executed in real time as mobile equipment 100 is operating. As used herein, the terms "real time" or "real-time" encompass both a response that occurs simultaneously with an input event, as well as a response that occurs some time after the input event due to ordinary latencies inherent in processing, communications, and/or the like. Process 500 assumes that a temperature monitoring device 300 is provided in oil fill hole 214 of one or a plurality of rollers 200 in one or more tracks 110.

While process 500 is illustrated with a certain arrangement and ordering of subprocesses, process 500 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 510, process 500 determines whether or not to continue. For example, process 500 may continue for as long as mobile equipment 100 is on and/or a temperature monitoring mode is active. When determining that process 500 is to continue (i.e., "Yes" in subprocess 510), process 500 proceeds to subprocess 510. Otherwise, when determining that process 500 is not to continue (i.e., "No" in subprocess 510), process 500 ends.

In subprocess 520, controller 130 polls or otherwise interrogates one or more temperature monitoring devices 300. It is generally contemplated that there will be a plurality of temperature monitoring devices 300, each installed within a respective one of a plurality of rollers 200. In this case, controller 130 may interrogate all of temperature monitoring devices 300 at the same time or one at a time, depending on the particular interrogation protocol that is utilized. In an embodiment in which temperature monitoring devices 300 are passive RFID tags, subprocess 520 may comprise transmitting electromagnetic waves that energize temperature monitoring devices 300.

In an alternative embodiment, each temperature monitoring device 300 may comprise a power supply 340, and may transmit the temperature, measured by temperature sensor 310, continuously or periodically at regular intervals, without being interrogated by controller 130. In such an embodiment, subprocess 520 may be omitted.

The measured temperature or other temperature indication (e.g., Boolean value, representing whether or not the measured temperature exceeds a predefined threshold) is received from each temperature monitoring device 300 in subprocess 530. In an embodiment in which temperature monitoring device 300 transmits a measured temperature, the received temperature may be compared to a predefined threshold in subprocess 540. The predefined threshold may be set to a temperature value that is representative of potential overheating of roller 200. This temperature value may be determined empirically, by simulation, and/or the like. In an alternative embodiment in which temperature monitoring device 300 transmits an indication of whether or not the measured temperature exceeds the predefined threshold, the indication will itself indicate whether or not the temperature exceeds the predefined threshold. In either case, if no temperature exceeds the predefined threshold (i.e., "No" in subprocess 540), process 500 returns to subprocess 510. Otherwise, if at least one temperature exceeds the predefined threshold (i.e., "Yes" in subprocess 540), process 500 proceeds to subprocess 550.

In subprocess 550, controller 130 issues an alert. For example, controller 130 may communicate with a console in cabin 120 or a remote terminal to display an alert to a human operator. The alert may notify the human operator that a roller 200 is overheating, include the measured temperature for the overheating roller 200, include the identity of the overheating roller 200, and/or include additional information. Additionally or alternatively, controller 130 may transmit the alert to another system of mobile equipment 100 for further processing. Once the alert has been issued, process 500 may return to subprocess 510.

In an embodiment, the alert may identify which roller(s) 200 are overheating. For example, when transmitting temperature indications, each temperature monitoring device 300 may also transmit an identifier that uniquely identifies each roller 200, such that controller 130 can determine the particular roller 200 with which each received temperature indication is associated. Thus, controller 130 can identify the particular roller(s) 200 that require attention to the human operator or other system of mobile equipment 100.

Figure 6:
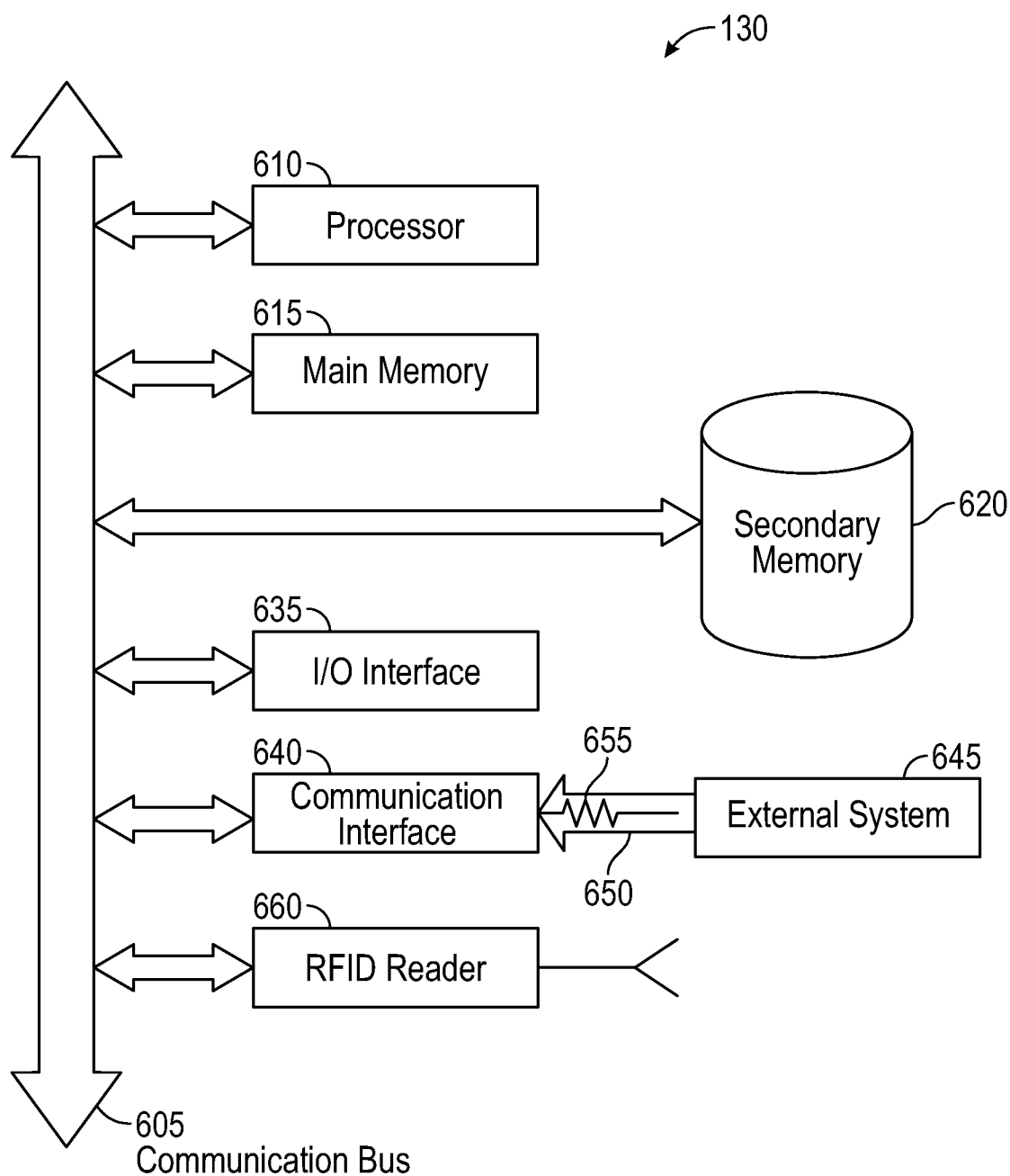
FIG. 6 illustrates a schematic diagram of an example controller, according to an embodiment.

FIG. 6 illustrates a schematic diagram of an example controller 130, according to an embodiment. Controller 130 may implement process 500, which may be implemented as one or more computer-executable software modules. To this end, controller 130 may comprise one or more processors 610. Processor(s) 610 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 610. Examples of processors which may be used in controller 130 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 610 may be connected to a communication bus 605. Communication bus 605 may include a data channel for facilitating information transfer between storage and other peripheral components of controller 130. Furthermore, communication bus 605 may provide a set of signals used for communication with processor(s) 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Controller 130 may comprise main memory 615. Main memory 615 provides storage of instructions and/or other data for software executing on processor 610, such as one or more software modules implementing process 500. It should be understood that instructions stored in the memory and executed by processor 610 may be written and/or compiled according to any suitable language, including without limitation C/C++, Java, JavaScript, Perl, Python, Visual Basic, .NET, and the like. Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Controller 130 may comprise secondary memory 620. Secondary memory 620 is a non-transitory computer-readable medium having instructions and/or other data for software, such as one or more software modules implementing process 500, stored thereon. In this description, the term "computer-readable medium" is used to refer to any non-transitory computer-readable storage media used to provide computer-executable code and/or other data to or within controller 130. The computer software stored on secondary memory 620 is read into main memory 615 for execution by processor 610. Secondary memory 620 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Controller 130 may comprise an input/output (I/O) interface 635. I/O interface 635 provides an interface between one or more components of controller 130 and one or more input and/or output devices. For example, I/O interface 635 may receive the output of one or more sensors onboard mobile equipment 100 and/or output control signals to one or more components of mobile equipment 100.

Controller 130 may comprise a communication interface 640. Communication interface 640 allows software to be transferred between controller 130 and external devices, networks, or other information sources. For example, instructions and/or other data may be transferred to controller 130, over one or more networks, from a network server via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 110 with a network or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 640 is generally in the form of electrical communication signals 655. These signals 655 may be provided to communication interface 640 via a communication channel 650 between communication interface 640 and an external system 645. In an embodiment, communication channel 650 may be a wired or wireless network, or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 615 and/or secondary memory 620. Computer-executable code can also be received from an external system 645 via communication interface 640 and stored in main memory 615 and/or secondary memory 620. Such computer-executable code, when executed by processor(s) 610, enable controller 130 to perform various functions, including process 500.

In an embodiment, controller 130 comprises an RFID reader 660. RFID reader 660 interrogates temperature monitoring devices 300 using a wireless transmitter. RFID reader 660 may transmit electromagnetic signals that activate integrated antenna 340 in each temperature monitoring device 300 to return a wave, representing a measured temperature or other temperature indication (e.g., Boolean value, representing whether or not the measured temperature exceeds a predefined threshold), to RFID reader 660. The temperature indications may be received by a wireless receiver in RFID reader 660, and used by processor 610, for example, in process 500. It should be understood that the wireless transmitter and wireless receiver may be implemented as a wireless transceiver.

INDUSTRIAL APPLICABILITY

The rollers of a track are critical to the operation of the track. Thus, overheating of these rollers can result in failure of the track. Accordingly, embodiments are disclosed for a temperature monitoring device 300 that can be installed within an oil fill hole 214 of each roller 200 within a track 110. Each temperature monitoring device 300 may monitor the oil temperature within a respective roller 200, and communicate that oil temperature or other temperature indication to a controller 130. Controller 130 may alert a local or remote human operator or another system when the temperature of a roller 200 exceeds a predefined threshold, indicative of overheating (e.g., potentially resulting in a failure of track 110).

Each temperature monitoring device 300 may comprise a temperature sensor 310 with a probe 315 that extends into an interior cavity 216 of shaft 210 of roller 200 to contact and measure the temperature of the oil within interior cavity 216, and an integrated antenna 330 that wirelessly transmits the measured temperature to controller 130. In addition, each temperature monitoring device 300 may be sized and shaped to plug oil fill hole 214, to thereby prevent the egress of oil through oil fill hole 214. Temperature monitoring devices 300 may be configured to be fixed within oil fill hole 214 via any suitable fastening means, and removed from oil fill hole 214 via any suitable unfastening means. In an embodiment, temperature monitoring devices 300 are active or passive RFID tags that can be easily removed and replaced as needed.

Existing rollers 200 may be retrofitted with temperature monitoring devices 300. In particular, temperature monitoring device 300 may be designed to have the same shape and dimensions as the existing pin that is used to plug oil fill hole 214, and utilize a fastening means that is compatible with the existing oil fill hole 214. Thus, to enable process 500, the pin in each oil fill hole 214 may simply be replaced with a temperature monitoring device 300, and controller 130 may be reconfigured (e.g., retrofitted with RFID reader 660 and/or programmed to implement process 500).

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a mobile equipment with tracks, it will be appreciated that it can be implemented in various other types of machines with rollers, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A roller comprising:
a shaft including
an interior cavity along a longitudinal axis of the shaft,
at least one aperture along an axis of the shaft, which is at a non-zero angle with respect to the longitudinal axis, wherein the at least one aperture is in fluid communication with the interior cavity, and
an oil fill hole through one end of the shaft, along the longitudinal axis, and in fluid communication with the interior cavity;
a rim configured to rotate around the shaft;
an annular space between the shaft and the rim, wherein the annular space is in fluid communication with the at least one aperture of the shaft; and
a temperature monitoring device mounted in the oil fill hole of the shaft.

2. The roller of claim 1, wherein the temperature monitoring device comprises a temperature sensor configured to measure a temperature of oil within the interior cavity.

3. The roller of claim 2, wherein the temperature sensor comprises a probe that extends from one end of the temperature monitoring device into the interior cavity.

4. The roller of claim 2, wherein the temperature monitoring device comprises a wireless transmitter configured to wirelessly communicate an indication of the measured temperature to at least one controller of a mobile equipment on which the roller is installed.

5. The roller of claim 1, wherein the temperature monitoring device is a passive radio frequency identification (RFID) tag that contains no battery.

6. The roller of claim 1, wherein the temperature monitoring device matches a cross-sectional profile of the oil fill hole, in a plane that is orthogonal to the longitudinal axis, so as to plug the oil fill hole.

7. The roller of claim 1, further comprising an annular seal between the rim and each end of the shaft, wherein each annular seal seals the annular space.

8. The roller of claim 7, further comprising an annular collar between each annular seal and each end of the shaft, wherein each annular collar holds the respective annular seal in place.

9. A track comprising:
a belt; and
a plurality of rollers, each of the plurality of rollers in contact with the belt;
wherein each of the plurality of rollers is a roller of claim 1.

10. A mobile equipment comprising a pair of tracks;
wherein each of the tracks of the pair of tracks comprises a track of claim 9.

11. The mobile equipment of claim 10, wherein the mobile equipment is a bulldozer.

12. The mobile equipment of claim 10, wherein the mobile equipment comprises a controller that includes a wireless receiver, and wherein the temperature monitoring device in each roller of the plurality of rollers of each track comprises:
a temperature sensor configured to measure a temperature of oil within the interior cavity; and
a wireless transmitter configured to wirelessly communicate an indication of the measured temperature to the wireless receiver of the controller.

13. The mobile equipment of claim 12, wherein, in each roller of the plurality of rollers of each track, the temperature monitoring device is a passive radio frequency identification (RFID) tag that contains no battery, and wherein the controller comprises an RFID interrogator that includes the wireless receiver and a wireless transmitter configured to energize the temperature monitoring device.

14. The mobile equipment of claim 12, wherein the controller is configured to:
receive the indication of the measured temperature from each temperature monitoring device;
determine whether the measured temperature from any of the temperature monitoring devices exceeds a predefined threshold based on the received indication of the measured temperature from each temperature monitoring device; and
when determining that the measured temperature of one of the temperature monitoring devices exceeds the predefined threshold, issue an alert.

15. The mobile equipment of claim 14, wherein the temperature monitoring device in each roller of the plurality of rollers of each track is a passive radio frequency identification (RFID) tag that contains no battery, wherein the controller comprises an RFID reader that includes the wireless receiver and a wireless transmitter configured to energize the temperature monitoring device, and wherein the controller is further configured to interrogate each temperature monitoring device via the RFID reader.

16. A roller comprising:
a shaft including
an interior cavity along a longitudinal axis of the shaft,
at least one aperture along an axis of the shaft, which is at a non-zero angle with respect to the longitudinal axis, wherein the at least one aperture is in fluid communication with the interior cavity, and
an oil fill hole through one end of the shaft, along the longitudinal axis, and in fluid communication with the interior cavity;
a rim configured to rotate around the shaft;
an annular space between the shaft and the rim, wherein the annular space is in fluid communication with the at least one aperture of the shaft; and
a temperature monitoring device mounted in the oil fill hole of the shaft, wherein the temperature monitoring device matches a cross-sectional profile of the oil fill hole, in a plane that is orthogonal to the longitudinal axis, so as to plug the oil fill hole, and wherein the temperature monitoring device includes
a temperature sensor configured to measure a temperature of oil within the interior cavity, wherein the temperature sensor comprises a probe that extends from one end of the temperature monitoring device into the interior cavity, and
a wireless transmitter configured to wirelessly communicate an indication of the measured temperature to at least one controller of a mobile equipment on which the roller is installed.

17. The roller of claim 16, wherein the temperature monitoring device is a passive radio frequency identification (RFID) tag that contains no battery.

18. A track comprising:
a belt; and
a plurality of rollers, each of the plurality of rollers in contact with the belt;

wherein each of the plurality of rollers is a roller of claim 16.

19. A mobile equipment comprising a pair of tracks;
wherein each of the tracks of the pair of tracks comprises a track of claim 18.

20. A method of monitoring temperatures in a plurality of rollers in one or more tracks of a mobile equipment, the method comprising:
provided a temperature monitoring device in an oil fill hole of each of the plurality of rollers; and
by a controller onboard the mobile equipment,
receiving an indication of a measured temperature from each temperature monitoring device,
determining whether the measured temperature from any of the temperature monitoring devices exceeds a predefined threshold based on the received indication of the measured temperature from each temperature monitoring device, and
when determining that the measured temperature of one of the temperature monitoring devices exceeds the predefined threshold, issuing an alert.

\* \* \* \* \*